United States Patent
McDowell

(10) Patent No.: US 10,637,738 B1
(45) Date of Patent: Apr. 28, 2020

(54) NETWORK TRAFFIC LOGS WITH INTEGRATED PRODUCT IDENTIFIERS

(71) Applicant: Amazon Technologies, Inc., Seattle, WA (US)

(72) Inventor: Patrick Edward McDowell, New York, NY (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 252 days.

(21) Appl. No.: 15/607,100

(22) Filed: May 26, 2017

(51) Int. Cl.
*H04L 12/24* (2006.01)

(52) U.S. Cl.
CPC .......... *H04L 41/12* (2013.01); *H04L 41/0853* (2013.01); *H04L 41/0253* (2013.01); *H04L 41/085* (2013.01)

(58) Field of Classification Search
None
See application file for complete search history.

(56) References Cited

U.S. PATENT DOCUMENTS

| | | | | |
|---|---|---|---|---|
| 5,826,014 | A * | 10/1998 | Coley | G06Q 20/027 726/12 |
| 8,087,017 | B1 * | 12/2011 | Whaley | G06F 21/64 713/187 |
| 2011/0202714 | A1 * | 8/2011 | Burch | G06F 9/45533 711/112 |
| 2015/0040217 | A1 * | 2/2015 | Abuelsaad | H04L 63/1408 726/22 |
| 2015/0254451 | A1 * | 9/2015 | Doane | G06F 21/44 726/1 |
| 2015/0281010 | A1 * | 10/2015 | Matsushima | G06F 21/552 709/224 |
| 2018/0225254 | A1 * | 8/2018 | Hu | H04L 12/4641 |

* cited by examiner

*Primary Examiner* — Michael A Keller
(74) *Attorney, Agent, or Firm* — Quarles and Brady LLP

(57) ABSTRACT

A system and method for generating network traffic logs including product identifiers is presented. A first computer system includes a first memory coupled to a first processor. The first memory includes instructions that upon execution cause the first computer system to receive a log entry from a second computer system. The log entry includes a virtual network interface identification associated with a first virtual computer system instance. The instructions cause the first computer system to determine a machine image using the virtual network interface identification, and update a record indicating usage of virtual computer system instances created using the machine image.

20 Claims, 10 Drawing Sheets

METRICS BROWSER

Metrics Report for All Products – 1/1/2017 9:00am – 1/1/2017 9:15am

| Product | Product ID | Sent | Received |
|---|---|---|---|
| *Security Products* | | | |
| Firewall Product #1 | MI-456789123 | 123 GB | 125 GB |
| Firewall Product #2 | MI-789123456 | 12 GB | 12.8 GB |
| Firewall Product #3 | MI-741852963 | 4.1 GB | 5.5 GB |
| Intrusion Detection #1 | MI-852963741 | 3.7 GB | 3.7 GB |
| Intrusion Detection #2 | MI-963741852 | 1.0 GB | 1.1 GB |
| *Data Storage Products* | | | |
| Cloud Storage #1 | MI-654321987 | 1.4 GB | 130 GB |
| Cloud Storage #2 | MI-321987654 | 700 MB | 122 GB |
| Backup Solution #1 | MI-784951623 | 4.0 GB | 257 GB |
| Backup Solution #2 | MI-362951847 | 1.1 GB | 50 GB |
| Backup Solution #3 | MI-986753421 | 1.2 BG | 750 MB |

METRICS BROWSER

Metrics Report for [DEVELOPER] – 1/1/2017 9:00am – 1/1/2017 9:15am

| Product | Product ID | Sent | Received | # Cust. | Primary Geo. Loc. | Primary Source Region | Primary Dest. Region |
|---|---|---|---|---|---|---|---|
| *Individual Firewall Product* | | *145.2 GB* | *278.1 GB* | 28,154 | | | |
| Individual Firewall Product v1.0 | MI-456789123 | 123 GB | 125 GB | 1,023 | EU West | EU West | EU West |
| Individual Firewall Product v1.1 | MI-789123456 | 12 GB | 12.8 GB | 15,055 | EU West | EU West | US East |
| Individual Firewall Product v2.0 | MI-741852963 | 4.1 GB | 5.5 GB | 12,076 | EU West | EU West | EU East |
| *Enterprise Firewall Product* | | | | 11,334 | | | |
| Enterprise Firewall Product v1.0 | MI-852963741 | 3.7 GB | 3.7 GB | 758 | US West | US West | US West |
| Enterprise Firewall Product v1.1 | MI-963741852 | 1.0 GB | 1.1 GB | 7,501 | US West | US Central | US Central |
| Enterprise Firewall Product v2.0 | MI-654321987 | 1.4 GB | 130 GB | 3,075 | US West | US West | EU West |
| *Network Tools* | | *5.8 GB* | *429 GB* | 27,871 | | | |
| Router v1.0 | MI-321987654 | 700 MB | 122 GB | 758 | S. America | S. America | S. America |
| Router v2.0 | MI-784951623 | 4.0 GB | 257 GB | 9,057 | S. America | S. America | S. America |
| Router v3.0 | MI-362951847 | 1.1 GB | 50 GB | 18,056 | S. America | S. America | EU West |

FIG. 5

NETWORK TRAFFIC LOGS WITH INTEGRATED PRODUCT IDENTIFIERS

BACKGROUND

In a large distributed computing system of a computing resource service provider, various customers, users, services, and resources of the computing resource service provider are in frequent communication with each other. To provide effective operation of such a distributed computing system and the appropriate allocation of resources to the components of such a system, it can be helpful to collect metrics enabling an analysis of the degree to which the components utilize the computing system's resources. But in some multi-tenant computing systems, users and their respective services and resources are arranged in private networks. Those private networks can make it difficult to know how much data is being driven through the distributed computing system by particular components or products that may be running within those private networks.

BRIEF DESCRIPTION OF THE DRAWINGS

The detailed description is set forth with reference to the accompanying figures. The use of the same reference numbers in different figures indicates similar or identical items or features.

FIG. 4 is a screenshot depicting an example report that may be generated by a metrics service.

FIG. 5 is a screenshot depicting an example report that may be generated by the metrics service for a particular vendor.

DETAILED DESCRIPTION

Figure 1:
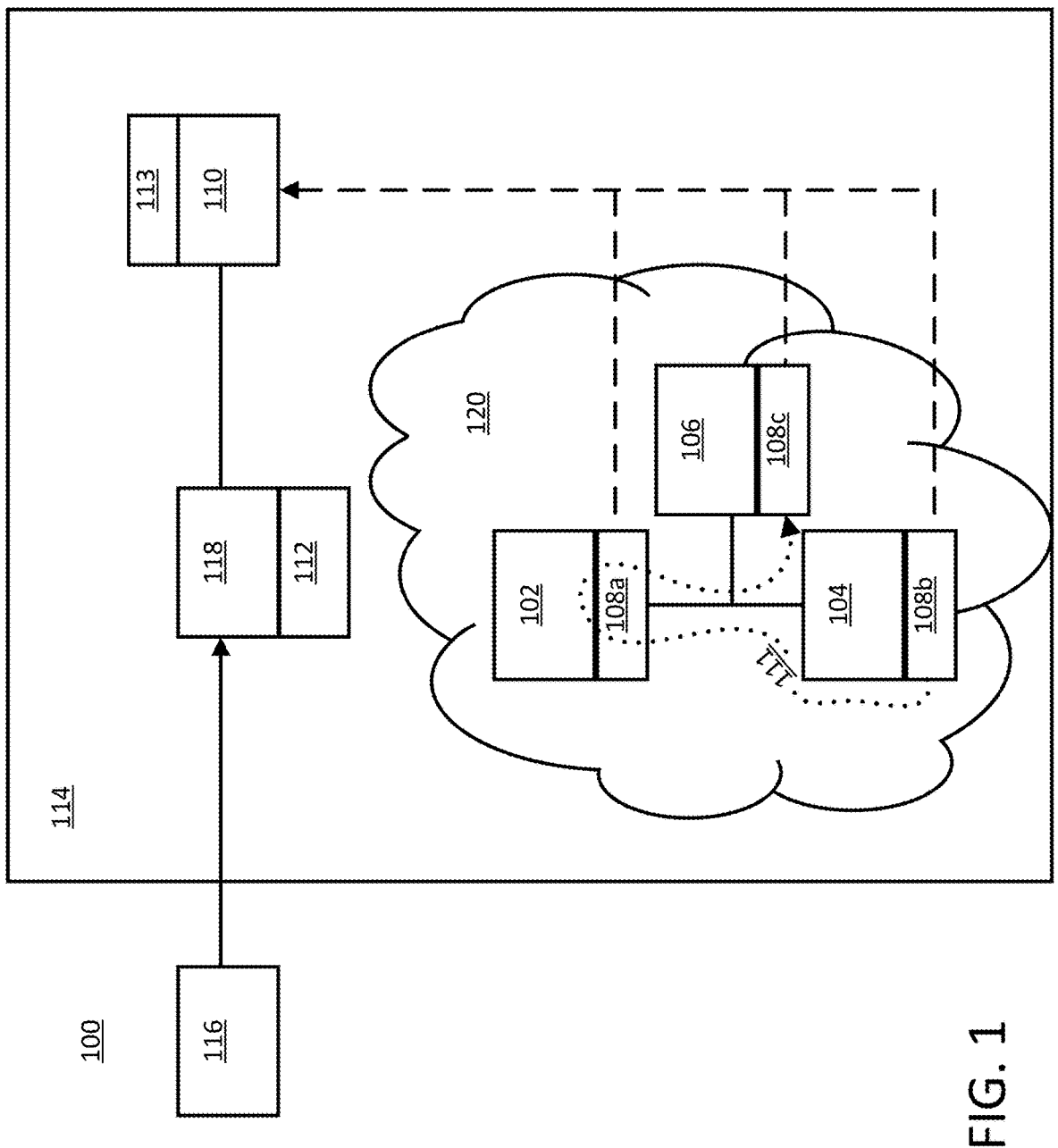
FIG. 1 illustrates an environment in which a computing resource service provider may provide customers with access to computer log information generated by computer systems operated by the computing resource service provider.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Techniques described and suggested herein relate to improvements in network and computer logging in multi-tenant computing environments. A computing resource service provider, such as a company or other organization, may operate computing resources programmatically managed by a customer of the computing resource service provider. For example, the computing resource service provider may operate a virtual computer system service, a marketplace that makes virtual machine appliances available for use by customers, and an on-demand storage service, these services may provide computing resources to customers of the computing resource service provider.

The customer may remotely load software, configure, start, stop, and perform other operations on computer system resources made accessible to the customer by the computing resource service provider. The computing resource service provider may leverage the computer systems implementing the resources provided to the customers by allowing over-subscription of the computing systems. Furthermore, at least a portion of the computing resources provided to the customer may be virtualized. For example, the computing resource service provider may provide computing resources such as virtual computer system instances to the customer. The customer can then use those virtual computer system instances to implement various applications and services, such as web servers, data storage systems, and network security functions. Similarly, vendors may package software into machine images that can be used to launch virtual machines. A customer can subscribe or otherwise obtain access to use such a machine images to launch virtual machines into the customer's account.

The computing resource service provider or a third-party vendor may implement a product instance image, such as a virtual machine image that includes software such as a firewall, monitor, data loss prevention device, or other security feature or network traffic analyzer or inspector to protect customer information. The image in turn can be launched as a product virtual machine or put another way, a virtual machine that includes a software product, such as a firewall, monitor, or other software. As a result of these security features and the virtualized computing environment, network log information and other computer log information for operations in the computing environment may not be accessible to the customer or vendor of such a product machine image. As such, the computing resource service provider may collect the log information on behalf of the customers and/or vendors, package the information, and provide the information to the customers and/or vendors.

In some cases, customers of the computing service provider may be able to arrange their computing resources into virtual networks (VNs). When arranged within a VN, a particular customer's computing resources are capable of communicating with other computing resources contained within the VN, but are generally prevented from communicating with computing resources that belong to different customers and are contained within different VNs. This arrangement, therefore, provides a secure environment in which a customer can setup and operate a number of computing resources in a virtualized environment within a secure network. As such, a single computer system may operate a number of virtual resources that have each been placed into different VNs by various customers. The VN setup allows the computing resources of each VN to be isolated from one another, even when executed on the same piece of physical computing hardware.

With a VN so configured, a customer can launch computing resources into their VN. This generally involves creating a virtual machine and then allocating each virtual machine an IP address that belongs within a private IP address range defined by the customer. The computing resources may include virtual machines that include and execute software that effectuates web servers, databases, application servers, and the like.

A logging service monitors traffic flow within the various VNs hosted by the computing service provider. The logging service can generate metrics on traffic flow and volume and resource utilization. The metrics can assist the computing service provider and/or customer with analyzing how IP traffic is going to and from computing resources in the virtual network. In some cases, the some or all of the metrics may be provided to third party vendors, such as on an anonymized basis, enabling them to understand how their own products are being utilized within customer virtual networks.

Conventional logging services may only capture the Internet protocol (IP) addresses associated with data traffic occurring within the various networks and between the computing resources implemented by the computer resources service provider. While such data is useful in monitoring the operation of the virtual computer system service, the data may not contain information regarding the identification of the computing resources that are driving traffic within the virtual computer system service nor may this information be shared with a vendor of the computing resource. Specifically, where customers create computing resources by creating instances of third party products, the data captured by a conventional logging system may not identify those third-party products or be made available to such third party. This, in turn, can make it difficult for the third party to identify the volumes of data traffic being generated by their products or which of their products are being used by the third party's customers. Example third party products that may be instantiated into the virtual computer system service by customers can include custom firewalls, web servers, data storage systems, and the like. In the present disclosure, a logging system is provided that captures information describing not only the amount, source, and destination of network traffic moving within the virtual computer system service, but also identifications of the computing resources that generated at least part of that network traffic. Similarly, such information can be made available to a third party that vends the computing resource so the third party can better understand how the product is being used. In an example embodiment, all or a portion of the information obtained by the logging system can be made available to a third party where all or a portion of the information can be first anonymized before being made available.

In an example virtual computer system service, customers can create instances of products provided or distributed by vendors (e.g., software developers or other third parties that distribute software for use within the virtual computer system service). Those product instances, once created, are accessible to the customer and may be placed by the customer into a VN. The product instances are generally virtual servers or virtual computing resources that are created according to a template associated with the product being instantiated or otherwise provided by the product's vendor. The template specifies how the product is to be configured when instantiated in a virtual computer system instance for the customer. That may involve specifying a particular configuration for the root volume of the instance when the product is setup. For example, a particular operating system and set of application servers and applications to be setup on the virtual computer system instance executing the product can be specified by the product's template. Additionally, the template may specify launch permissions to be associated with the product's instances. Each product is associated with a particular identification code that can be used to uniquely identify the product.

In some embodiments, the present logging system is configured to determine whether the source or destination of network traffic within a virtual computer system service is a virtual machine running a product. If so, the logging system incorporates an identification of the product into the logging data. As such, the logging data enables the analysis of how much network traffic is being generated by particular products within the virtual computer system service, even when those products have been instantiated into different virtual computer system instances in different VNs.

The log information, once stored, can be accessed through a metrics service to provide summaries and analysis of the log information to a user, such as the customer that operates the virtual network, and/or the third-party that provides the virtual machine including the product. The output of the metrics service may include visualizations, alerts, and information corresponding to the log information on behalf of customers.

For example, the metrics service may provide a customer with a current network load on the customer's virtual computer system instances or within the customer's VN. The current network load can also indicate which products within the customer's VN are generating the most traffic, for example. As another example, the metrics service may provide the third-party with anonymized information that shows that an instance of the virtual machine product received, processed, and/or sent a certain amount of traffic, how long the virtual machine was instantiated, whether the virtual machine crashed, etc. This information may be used, in turn, by third parties (e.g., product developers) to analyze the usage of instances of virtual machine products developed by the third party. The usage information may be further processed to determine revenues generated by different virtual machine products developed by the third party and, optionally, the profitability of those products.

In some embodiments, the metrics service can also generate metrics for network traffic across a number of different VNs of different customers. That is, the metrics may be generated for all network traffic within the virtual computer system service. For example, a computer service provider may wish to know the volume of network traffic being generated by particular products that have been instantiated within the virtual computer system service. To determine that volume for a particular product, the metrics service may sum up all network traffic generated by virtual computing resources that are associated with the product's identification (i.e., that are instantiations of the product). The total amount of traffic may then be incorporated into a report for review by a user such as the computing resource service provider or a vendor of the product. If the product is one offering in a class of products offered, for example, such a metric may indicate the popularity of this particular product within the virtual computer system service with respect to other products in the class.

FIG. 1 illustrates a simplified environment 100 in which a computing resource service provider may provide users and/or vendors with reports describing the usage of particular products instantiated within environment 100.

Environment 100 includes server computer system 114. Server computer system 114 implements a number of virtual machines 102-106. Server computer system 114 may implement a number of virtual machines, where different virtual machines may be assigned to and controlled by different customers of the computer resource service provider that provides server computer system 114. In this example, virtual machines 102-106 are assigned to a single customer and have been allocated to a VN 120 operated by the customer. In this example, each virtual machine may run different servers (not illustrated), each of which may include its own virtualization system 108a-108c; however in other embodiments the virtual machines may be hosted on one or more servers. In addition to providing virtual machines 102-106, server computer system 114 may provide other virtual computing capacity or storage capacity to customers.

In this example, virtual machine 102 is an appliance executing a product instantiated by the customer into virtual machine 102. The product executed by virtual machine 102 may be configured to, among other functions, analyze or otherwise inspect network data traffic routed to, from, or through virtual machine 102. For example, virtual machine 102 may implement a firewall, data packet inspect, network traffic monitor, or data loss prevention device. Virtual machines 102-106 are configured to communicate with one another. In some embodiments, server computer system 114 is connected to an external network system (not shown in FIG. 1) to enable virtual machines 102-106 implemented by server computer system 114 to communicate data with external computer system.

Each virtual machine 102-106 is associated with a corresponding virtualization system 108a-108c. Virtualization systems 108a-108c may implement communication managers configured to process incoming and outgoing data communications for virtual machines 102-106. In specific embodiments, the virtualization system may include a hypervisor and a Dom0. Additionally, as described herein, each virtualization system 108a-108c may implement data logging functionality configured to analyze incoming and outgoing data communications and generate log entries describing attributes of those data communications. Example log entries, may include, for example, the sources and destinations of data communications, source and destination ports for the data communication, an identification of a virtual network interface of the virtualization system 108a-108c on which the data communication was received and/or transmitted, a size of the data communication, a time that the data communication was received and/or transmitted, and an identification of a product instantiated into the virtual machine to which the data communication was transmitted or from which the data communication was received, for example. In a specific example, the data logging functionality may run in the Dom0 or elsewhere, such as on a network card attached to the server hosting the virtual machine.

As virtualization systems 108a-108c process data communications to generate log entries, the contents of those log entities are transmitted to a logging service 110 for storage. To illustrate, the dotted line 111 in FIG. 1 represents a data communication including one or more data packets that originates at the virtualization system 108b of virtual machine 104. The data communication is passed to virtual machine 102 via virtualization system 108a for processing. Once processed, a resulting data communication is passed along to virtualization system 108c, potentially for further processing or storage by virtual machine 106. In this example, virtualization system 108a may generate one or more log entries describing the reception and/or transmission of the data packet by virtualization system 108a. The one or more log entry can then be transmitted to logging service 110 by virtualization system 108a for storage. Similarly, virtualization system 108b and 108c may also generate log entries that can be transmitted to logging service 110.

Server computer system 114 includes a front end system 118. Front end system 118 provides one or more interfaces, such as web-based user interfaces or application programming interfaces (APIs) that enable customers to configure, launch, shut-down, and otherwise modify the operation of one or more of the customer's virtual machines 102-106. In some embodiments, front end system 118 relies upon (or is part of) a separate compute service 112 that is specifically configured to control the launching and operation of virtual machines within server computer system 114.

Front-end system 118 may further provide one or more interfaces enabling customers of server computer system 114 and vendors of products instantiated within server computer system 114 to retrieve metrics reports describing the usage of particular products within server computer system 114.

For example, a vendor 116 may access front-end system 118 to retrieve a metric report describing how the vendor's products are utilized within server computer system 114. When the report is requested by a vendor, the report may include anonymized data describing the volumes of data traffic received and/or generated by instantiations of the vendor's products within server computer system 114. The report may also include general information describing general attributes of the customers utilizing the vendor's products, such as a geographical location in which the largest number of customers using a particular product distributed by the vendor are located. The report may also include the number of customers using the vendor's products in different geographical locations.

To generate the metric reports, metrics service 113 may process the log data stored by logging service 110. This may involve metrics service 113 processing the log data to sum up the data traffic volumes for all virtual machines containing instantiations of particular vendor products within virtual computer system 114. While processing the log data, metrics service 113 can also generate anonymized data describing attributes of the customer utilizing the vendor's products for incorporation into the metrics report. In other cases, a customer may access front-end system 118 to retrieve a metric report describing the usage of particular products within the customer's VN 120. In that case, metrics service 113 may implement a similar process to analyze log data stored in logging service 110 to determine volumes of data traffic generated by particular products within the customer's VN 120.

Figure 2:
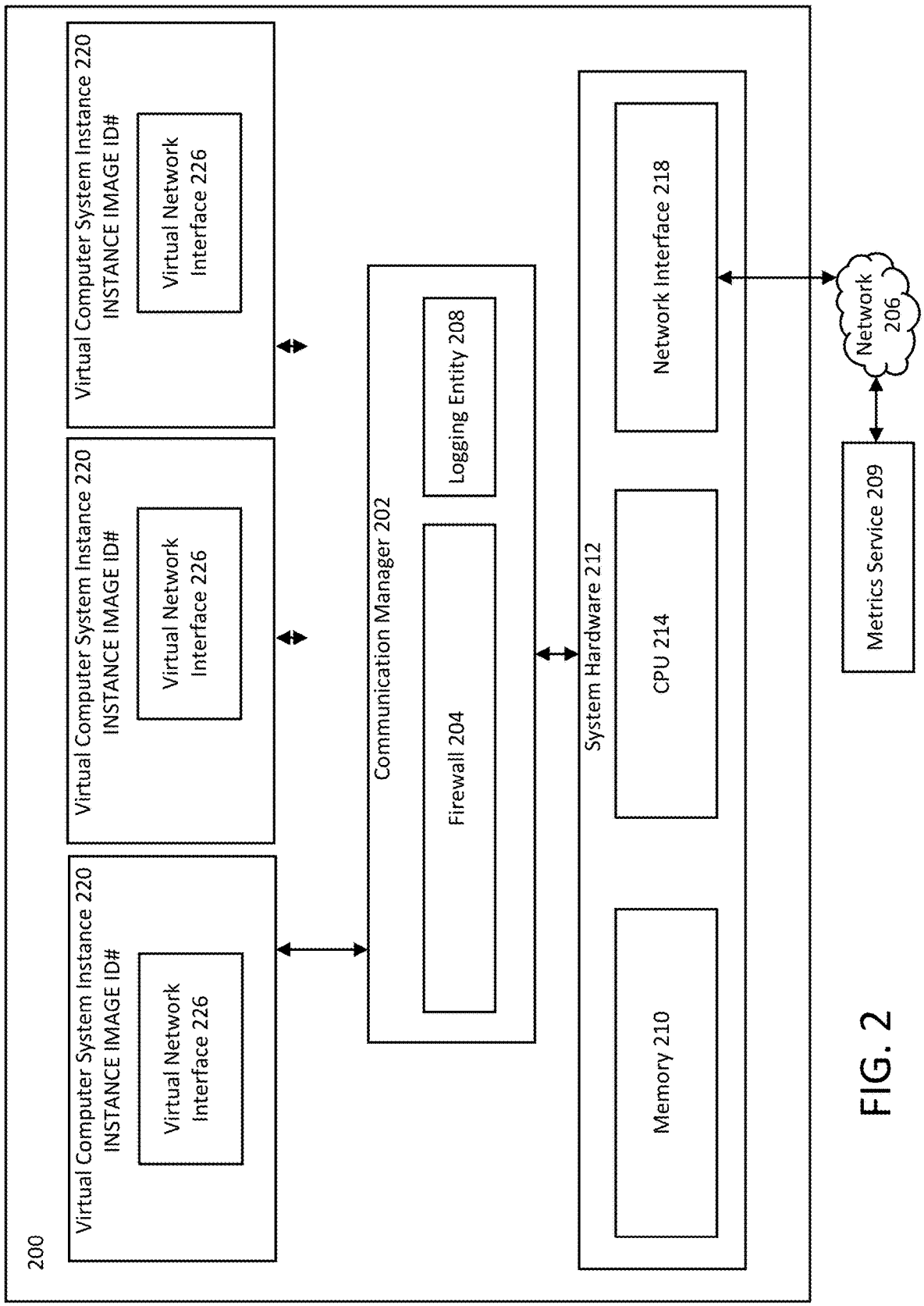
FIG. 2 depicts a simplified block diagram of a server computer system that may be used to practice at least one embodiment of the present disclosure.

FIG. 2 depicts an illustrative, simplified block diagram of server computer system 200 that may be used to practice at least one embodiment of the present disclosure. Server computer system 200 includes system hardware 212 used to support the execution of a variety of computing resources. The system hardware 212 includes memory 210, one or more central processing units (CPUs) 214, and network interface 218. System hardware 212 may include other hardware devices not shown in FIG. 2 for simplicity, such as graphics devices, input output (I/O) controllers or any other hardware device suitable for supporting the execution of one or more communication managers 202 or other applications. Central processing units 214 (also referred to as processors for simplicity) may be communicatively coupled to a number of systems or hardware devices, such as memory 210, and network interface 218.

Server computer system 200 executes applications, including communication manager 202 and virtual computer system instances 220. Each virtual computer system instance 220 includes a virtual network interface 226 that can provide a network interface with a virtual IP address for virtual computer system instances 220 that is within the customer's virtual network.

Virtual computer system instances 220 may be virtual computers configured to execute one or more applications as specified by the customer. For example, virtual computer system instance 220 may execute a web server operated by the customer, an application, a database, a firewall (e.g., configured to filter data transmissions through the virtual computer system instance 220), or a data storage system. Generally, virtual computer system instances 220 are created and configured by a customer of server computer system 200. In embodiments, at least some of the virtual machine images used to create the virtual computer system instances 220 are offered by an operator of server computer system 200 or a third party vendor.

The products offered in virtual machine images may be of many different types providing varying functionality. Generally products may be configured to perform any function on behalf of a customer of server computer system 200. In some cases, products may perform functions on network data packets or other communication traffic, such as an inspection of the contents of those data packets or routing of those data packets within a particular computer network. Products may provide security solutions or implement security appliances, including firewalls, intrusion detection systems, deep packet inspector systems, data loss prevention services, network appliances, and the like, data storage solutions, including cloud storage functionality, device backup solutions, database operations, and the like, and business intelligence solutions, including surveying solutions, resource scheduling solutions, and the like. In some example embodiments, each product is provided in association with a template that specifies how a virtual computer system instance 220 should be configured in order to provide the functionality provided by the product.

The machine image may include a set of configuration files that specify, for example, an image of an operating system including the product and resource set that should be allocated to the virtual computer system instance 220 executing the selecting product. The resource set may specify a number and configuration of processors, as well as a data storage capability for the virtual computer system instance 220. The data storage capabilities of the virtual computer system instance 220 may include specific requirements for volatile memory resources (e.g., random access memory (RAM) and cache) as well as persistent memory resources (e.g., local data storage requirements and remote networked data storage). The template can also specify a set of applications to be installed into the virtual computer system instance 220 to provide the functionality of the specified product, in an alternative embodiment.

Generally, configuration of a product can be performed by a user operating a suitable user interface for managing their virtual computing resources. The user interface may allow the user to search for and select a particular product and initiate instantiation of that product. When instantiating a product, server computer system 200 can, using the product's template, automatically create and configure a virtual computer system instance 220 with the selected product for use by the user. In some cases, the user may provide a number of additional inputs specifying particular details of how the product is to be configured once instantiated, such as by identifying a particular VN that the product should become part of Generally, however, the configuration of a particular product may occur with only a minimum amount of input from the user.

After a product is instantiated into a virtual computer system instance, operation of the virtual computer system instance passes to the user. The determination of the physical host for the virtual computer system instance may be based on a variety of factors, including a particular geographic area based at least in part on an Internet Protocol (IP) address associated with the customer, load on one or more physical hosts, network traffic associated with the one or more physical hosts, request response latency of the one or more physical hosts or any other information suitable for selecting a physical hosts to instantiate one or more computer instances.

Communication manager 202 (which may, in some embodiments, be executed in a hypervisor or a Dom0) includes a set of computer-executable instructions that, when executed by one or more processors of server computer system 200, causes server computer system 200 to provide a virtual operating platform and manage access to the system hardware 212 and virtual computer system instances 220.

Communication manager 202 is also configured to route data packets between virtual computer system instances 220 and external computer systems through network 206 as well as between virtual computer system instances 220 themselves. In this disclosure a data packet may refer to a single encapsulated packet of data to be communicated using a suitable transport protocol, such as TCP/IP or UDP. In other cases, however, a data packet may refer to a communication flow that includes multiple data packets that are related to one another and part of a single data communication stream. In this disclosure, references to a data packet shall be understood to be equally application to a communication flow.

When receiving data packets from an external computer system through network 206, communication manager 202 is configured to analyze the received data packets to identify a destination virtual IP address of a particular target virtual computer system instance 220 to which the data packets are directed and to determine the IP address of the server hosting such virtual IP address. Having identified the target virtual computer system instance 220, communication manager 202 can be configured to encapsulate the data packets in data packets that are addressed to the server hosting the target virtual computer system instance. The packets are then routed to that target virtual computer system instance 220 for processing. Similarly, when a first target virtual computer system instance 220 transmits a data packet to a second target virtual computer system instance 220, communication manager 202 is configured to receive that data packet, identify the second target virtual computer system instance 220 and then transmit the data packet to the server hosting the second target virtual computer system instance 220 for processing.

In embodiments, communication manager 202 may use Internet Protocol (IP) tunneling techniques to encapsulate and route communication data packets between the components of server computer system 200. The various components may be installed onto different hosts (i.e., physical computing systems) that are connected by a network. The network may include a physical network substrate that includes networking devices such as routers, switches, network address translators (NATs), and so on, as well as the physical connections among the various components and devices. Communication manager 202 then routes data packets through the network using IP tunneling. This enables communication manager 202 to receive data packets that, while being intended for delivery to one of virtual network interfaces 226, which may have private network addresses defined by the customer operating the virtual network, is actually addressed to a private IP address associated with the network interface 218 of the server. As such, communication manager 202 receives data packets addressed to network interface 218 and, using the IP tunneling technologies, repackages the data packets for delivery to one of virtual network interfaces 226. To perform the data packet encapsulation and decapsulation required to implement IP tunneling, communication manager 202 may rely upon a mapping table or database that correlates the private network addresses associated with virtual network interfaces 226 to the public network addresses associated with network interface 218.

Within server computer system 200, memory 210 may provide a computer-readable storage medium for storing data (e.g., programs, code modules, instructions) that may provide the functionality of at least one embodiment of the present disclosure. Network interface 218 may include various network interfaces connected to server computer system 200. Network interface 218 may be a hardware, software, or combination thereof configured to receive and transmit communication data, such as data packets generated by one or more of virtual computer system instances 220, over network 206 to one or more other computing systems (not shown). Although only one network interface 218 is shown, multiple network interfaces 218 may be connected to server computer system 200 in accordance with the present disclosure.

Server computer system 200 may also include firewall 204 that is configured to permit or block network traffic based at least in part on one or more security policies provided by the customer or computing resource service provider. Firewall 204 may be implemented as hardware, software, or a combination thereof. For example, firewall 204 may include a kernel module configured to filter network traffic directed to virtual computer system instances 220 implemented by server computer system 200.

Server computer system 200 includes logging entity 208 configured to obtain log information. As data packets (or a group of related data packets, referred to as a communication flow) pass through server computer system 200 (and, specifically, communication manager 202), logging entity 208 can identify attributes of those communications and record those attributes into a log file. The log file may be local to system hardware 212 (e.g., stored within memory 210) or may be stored remotely (e.g., stored within one or more of virtual computer system instances 220 or other data storage device accessible to system hardware 212).

In various embodiments, the log information captured by logging entity 208 includes customer identification information, virtual network driver identification information, packet count, byte count, timestamp corresponding to the start of the corresponding communication flow, timestamp corresponding to the end of the corresponding communication flow, and an action performed by the firewall 204. Logging entity 208 is also configured to record, for particular data packets an identification of a product associated with the source of a particular data packet and the product associated with the destination of the data packet, assuming such product identifications are available. The product identification identifies the product used to instantiate a particular product into a virtual computer system instance. For example, in an embodiment the product identification is an identifier of the machine instance used to instantiate the virtual computer system instance. For example, when a vendor creates a machine image that includes a product (e.g., a firewall, packet analyzer, etc.), the machine images may be assigned an identifier. When a virtual machine is launched from the machine image, the hypervisor may store the identifier of the machine image used to launch the virtual machine in or an identifier of the instance itself, for example, memory. Additionally, the hypervisor can be programmed to make the machine or instance identifier available to the logging entity 208 as well as information that identifies which communications are associated with the virtual machine (e.g., an identifier of a virtual network interface, a virtual IP address used by the virtual machine). As such, when the logging entity processes data packets it can match information in the packets to the information that identifies which communications are associated with the virtual machine and add the machine image or instance identifier to the record. In the general case, however, virtual computer system instances may be instantiated using templates that may not be related to a particular product offered by a vendor. Instead, the template may be associated with a tool, platform or other computing resources that a user may wish to instantiate into a virtual computer system instance. In that case, the template may more generally be associated with an instance template identification that identifies a template (e.g., a non-vendor product) used to instantiate a virtual computer system instance.

Figure 3:
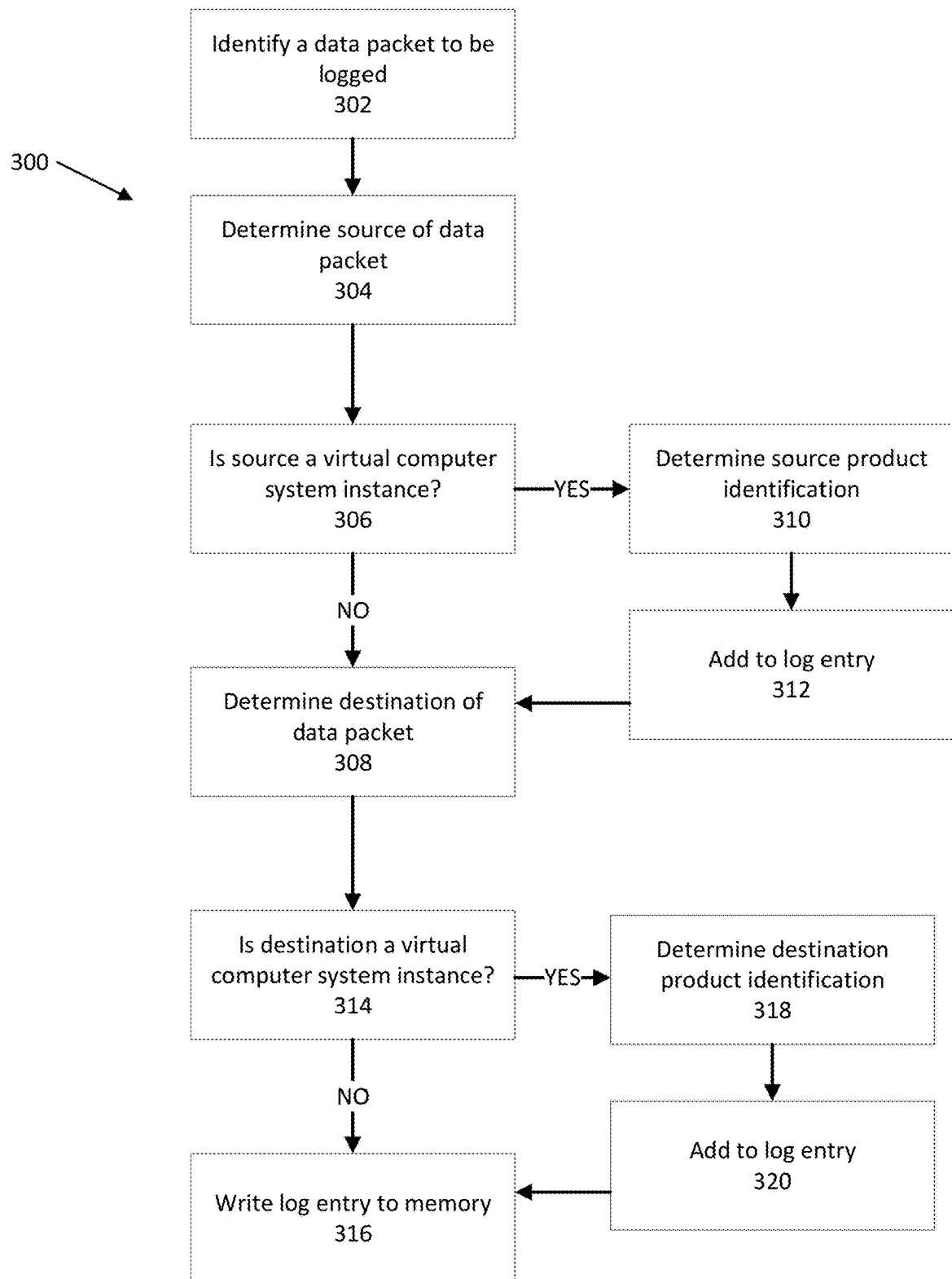
FIG. 3 is a flowchart depicting a method for a logging entity to generate log information that identifies machine images associated with either the source or destination of a data packet.

FIG. 3 is a flowchart depicting a method 300 for logging entity 208 (or another component of server computer system 200) to generate log information that identifies product associated with either the source or destination of a data packet to or from server computer system 200 or between components of computer system 200. In step 302 logging entity 208 identifies a communication data packet triggering a network log entry. To determine whether a particular communication data packet triggers a network log entry, logging entity 208 may analyze data packets flowing through communication manager 202 to determine whether the data packets match a set of criteria for logging. The criteria may be established by a customer of server computer system 200 or another user associated with server computer system 200, such as the vendor of the machine image including a product. For example, the vendor may have requested information about how his or her products are used and the criteria may specify that all data packets to or from the product virtual machine are to be tracked. In an embodiment, the customer may opt in to allow the vendor to receive anonymized data about how the product was used. In the same or other cases, the criteria may specify that only particular types of data packets are to be logged, or that logging will only occur over a given time period, for example. The criteria could also specify that only data packets from particular sources or having particular destinations (e.g., a range of source or destination IP addresses) should be logged. In some cases, the criteria may specify that only packets of a particular type (e.g., UDP versus TCP packets) should be logged. The criteria for whether a particular data packet is to be logged may be stored as a rule set encoded within memory 210 of system hardware 212.

Having identified a communication data packet that satisfies the logging criteria (e.g., a data packet addressed to a product virtual machine), in step 304 logging entity 208 determines a source of the data packet. This may involve determining a source IP address of the data packet or, an identifier of the virtual machine that sent the data packet used by the hypervisor.

With the source of the data packet identified in step 304, in step 306 the logging entity 208 determines whether the source is a virtual computer system instance 220. If not (e.g., the data packet was received from an external computer system through network 206), the source of the data packet is unlikely to be associated with a product virtual machine and the method moves on to step 308.

If, however, in step 306 logging entity 208 determined that the source of the data packet was a virtual computer system instance 220, in step 310 logging entity 208 determines a product identification associated with that virtual computer system instance 220. Logging entity 208 can determine the product identification using any suitable approach. In one embodiment, logging entity 208 may access the source virtual computer system instance 220 and execute (e.g., via a command line interface (CLI) or an API) an instruction on the virtual computer system instance 220 to determine the product identification. Alternatively, logging entity 208 may or access a file stored in the virtual computer system instance 220 that contains the product identification. Alternatively, logging entity 208 may access a look-up table that correlates virtual computer system instances 220 to product identifications. An example table is shown below and correlates an IP address associated with the virtual network interfaces 226 of virtual computer system instances 220 to product machine image identifications. In an alternative embodiment, an instance identifier could be used instead of a machine image identifier.

TABLE 1

| IP Address of Virtual Computer System Instance | Product ID |
| --- | --- |
| 192.168.1.1 | MI-123456789 |
| 172.31.16.139 | MI-987654321 |
| 192.168.2.1 | MI-123789456 |
| 192.168.1.200 | MI-789456123 |
| 172.31.16.21 | MI-963852741 |

The table mapping IP addresses of virtual computer system instances 220 to product identifications can be stored in any suitable location accessible to logging entity 208. New entries can be added to the table when a new virtual computer system instance 220 is created by a customer, or entries may only be added when a new virtual computer system instance 220 begins transmitting and receiving communication data packets. The data stored in the table may be periodically updated so that the data does not become stale as customers update and modify the contents of virtual computer system instances 220.

In some embodiments, determining the product identification includes executing a database lookup to identify a product name associated with the product identification. Generally product names can be easier for an individual to review and analyze when reviewing log data than other product identifications (e.g., alpha-numeric identification strings).

In step 312, with the product identification of the source of the data packet identified, logging entity 208 adds the product identification (and, optionally, product name) to a network log entry. An example log entry is shown below. In the example entry, the IP address of the data packet source is 172.31.16.139 and the corresponding machine image identification MI-987654321 has been added to the log entry. The log entry also includes a user identification or VN identification for the logging data ("123456789010"), an identification of the interface processing the data packet that generated the log entry ("eni-abc123de"), source port ("22"), destination port ("6"), protocol identification ("6"), a size of the data packet or communication flow (4249), start and end times for the flow ("1418530010" and "1418530070", respectively), and an indication of whether the traffic was accepted ("ACCEPT") and whether the logging activity successfully completed ("OK"). The IP address and machine image identification for the destination is, at this point in method 300, blank.

TABLE 2

2 123456789010 eni-abc123de 172.31.16.139 MI-987654321
XXX.XXX.XXX.XXX MI-XXXXXXXXX 20641 22 6 20 4249
1418530010 1418530070 ACCEPT OK In step 308, logging entity 208 determines a destination of the data packet. This may involve determining a destination IP address of the data packet, or an identifier of the packet's destination virtual machine.

With the destination of the data packet identified in step 308, in step 314 the logging entity 208 determines whether the destination is a virtual computer system instance 220. If not (e.g., the data packet was transmitted to an external computer system through network 206), the source of the data packet is unlikely to be associated with a product and the method moves on to step 316.

If, however, in step 312 logging entity 208 determined that the destination of the data packet is a virtual computer system instance 220, in step 318 logging entity 208 determines a product identification associated with that virtual computer system instance 220. Logging entity 208 can determine the product identification using any suitable approach. In one embodiment, logging entity 208 may access the destination virtual computer system instance 220 and execute (e.g., via a CLI or an API) an instruction on the virtual computer system instance 220 to determine the product identification. Alternatively, logging entity 208 may or access a file stored in the virtual computer system instance 220 that contains the product identification. Alternatively, logging entity 208 may access a look-up table that correlates the virtual computer system instances 220 to product identifications. See example Table 1 above. In some embodiments, determining the product identification includes executing a database lookup to identify a product name associated with the product identification. Generally product names can be easier for an individual to review and analyze when reviewing log data than other product identifications (e.g., alpha-numeric identification strings).

In step 320, with the product identification of the destination of the data packet identified, logging entity 208 adds the product identification (and, optionally, product name) to the logging entry. An example log entry is shown below. In the example entry, the IP address of the data packet destination is 172.31.16.21 and the product identification MI-963852741 for that destination has been added to the log entry.

TABLE 3

2 123456789010 eni-abc123de 172.31.16.139 MI-987654321
172.31.16.21 MI-963852741 20641 22 6 20 4249 1418530010
1418530070 ACCEPT OK In step 316, the log entry created by logging entity 208 is written to a memory such as a memory 210 of system hardware 212 or a remote storage drive, such as a cloud data storage system. The log entry may be transmitted into the storage using any suitable approach. In one embodiment, the storage system is a remote data running on a computer system that is also running a web server. The log entry can be transmitted into the database by issuing a hypertext transfer protocol (HTTP) request to the web server, wherein the HTTP request encodes the contents of the log entry to be stored in the database. In that case, the HTTP request may include the product identifications associated with one or more entities that participated in a particular data transmission. Once stored, the log entry (in combination with other log entries) can be retrieved by a customer or other user of server computer system 200 and analyzed to monitor operations of server computer system 200. In embodiment, the log entries generated by logging entity 208 may be published to a metrics service described in greater detail below. Additionally, the log entries may be published at various intervals of time or may be streamed directly to a receiving party as the logs are generated.

The network log information may enable a customer to troubleshoot various customer networks. The customer may operate a number of other resources that are in communication with the computing resources provided by the computing resource service provider. The log entries may enable the customer to troubleshoot problems in which some network traffic may not be reaching the customer's virtual computer system instances 220, for example. The network log information may include information corresponding to denied network traffic to the customer's computer instances, enabling the customer to see that the traffic has been blocked (e.g., by a firewall or other device).

The network log information may also be used in connection with intrusion detection and mitigation systems. For example, if a virtual computer system instance 220 has been compromised, the network log information may provide evidence of that comprise allowing remedial action to be taken.

The network log information generating by logging entity 208 may be transmitted to metrics service 209. Metrics service 209 may be a remote computer service accessed by logging entity 208 via communication network 206. Logging entity 208 can transfer log data to metrics service 209 via any suitable data transfer mechanism—for example, metrics service 209 may run an API enabling logging entity 208 to execute data transfer of log data into metrics service 209. Metrics service 209 may be executed on computer hardware that is separate from the computer hardware executing the functionality of communication manager 202 and virtual computer system instances 220. In such an arrangement, the resources utilized by metrics service 209 to process the incoming log data and generate corresponding metric reports can be separate from those used to execute routines on behalf of customers of server computer system 200.

Once log data is received from logging entity 208, metrics service 209 may perform analysis of and provide various visualizations of the logged network data, such as accepted traffic to the customer instances, traffic patterns to the customer's instances, and other visualizations. In some embodiment, logging entity 208 uses a publishing service to publish and schedule updates to the published log data that manages the transmission of log data to a remote storage system for access by metrics service 209. Such a publishing service may periodically or aperiodically check whether logging entity 208 has additional log information to be published to one or more end points or to be made accessible to metrics service 209. In various embodiments, the publishing service may transmit log information real-time or near real-time to the storage destination.

In an embodiment, metrics service 209 can analyze the network log data captured by logging entity 208 to determine metrics associated with particular products that have been instantiated within server computer system 200. To determine the amounts of data traffic for particular product, metrics service 209 may sum up the data traffic volumes for all virtual computer system instances 220 that were instantiated using the product and are associated with the product's product identification. For example, FIG. 4 is a screenshot depicting an example report that may be generated by metrics service 209. The report identifies a number of products 402 that have been instantiated within server computer system 200. For each product 402 listed, the report identifies the product identification of each product 402 as well as an amount of network traffic data generated by instances running the products and an amount of network traffic data received by instances running the products.

The amount of data transmitted by a particular product 402 can be determined by accessing the network logs recorded by logging entity 208 to identify packets or communication flows transmitted from sources having a product identification that matches the product identification of the particular product 402 for which metrics are being generated. Similarly, the amount of data received by a particular product 402 can be determined by accessing the network logs to identify packets received by destinations having a product identification that matches the product identification of the particular product 402 for which metrics are being generated.

Using the report depicted in FIG. 4, a user can examine the levels of usage of various products in the server computer system 200. This information can be useful in configuring the various resources of server computer system 200 (e.g., system hardware 212) so that the configuration and implementation of server computer system 200 is at least partially optimized for use in conjunction with the most popular and widely used products. Similarly, this metric information may be used to set pricing and compensation structures for the vendors of different products based upon the volumes of network traffic being driven by the products.

In other embodiments, metrics service 209 could generate reports that detail amounts of data traffic being generated by groups of products that are distributed by a particular vendor. In that case, the report can include anonymized data suitable for review by the product vendor. FIG. 5, for example, is a screenshot depicting an example report that may be generated by the metrics service for a particular product vendor. The report identifies a number of products 452 that are distributed by the vendor. The listing of products 452 is broken down by product identification and, for each product identification, shows data volumes sent 454 and received 456 by virtual computer system instances instantiated within server computer system 200 using those machine images over a given time period.

For each product, metrics service 209 may also determine a number of customers 458 running virtual computer system instances that are using that product. This information is aggregated and so does not disclose any personal information of a particular customer and instead gives the product vendor a general understanding of the volume of users using particular versions of their products within server computer system 200. For the groups of customers using each product, metrics service 209 may also identify a primary geographical location 462 of customers using the product. This may correspond, for example to the geographical region in which the most customers are using the product. Alternatively, the primary geographic location 462 for a particular product may reflect the geographic region in which instances of the product are processing the most data traffic, for example. Similarly, metrics service 209 may also determine and include in the report identifications of which geographic regions are responsible for being the source 464 of a majority of network traffic to instances of the product and the destination 466 of a majority of network traffic originating from instances of the product.

The geographical data included in the report depicted in FIG. 5 may be determined in any suitable manner by metrics service 209. For example, metrics service 209 may access a database that provides a correlation between network addresses that may be included with the log data received from logging entity 208 and particular geographic region. Using that information, metrics service 209 can identify particular geographic regions that are associated with the most voluminous sources and destinations of data traffic for particular products, for example. Alternatively, metrics service 209 may utilize a reverse IP address protocol configured to translate particular IP addresses contained within the log data to particular geographic locations. Once identified, the geographic locations can, in turn, be associated with (i.e., determined to be located within) particular geographical regions for the purposes of generating metric reports such as that depicted in FIG. 5.

Generally, each product identification within a report generated by metrics service 209 will correspond with a particular version of the vendor's products and so the report also shows summary data that displays the data metrics for each product category (e.g., summary data for all versions of a particular product). To generate the summaries, metrics service 209 may access a look-up table that relates each product identification to particular products distributed by the vendor. Using the report depicted in FIG. 5, a vendor can examine the levels of usage of various products (and versions of products) in the server computer system 200 that have been distributed by the vendor.

In various embodiments, the user interface provided by metrics service 209 when generating a metric report (see example reports of FIGS. 4 and 5) may allow the user to further manipulate and analyze the data being displayed. For example, the user interfaces may enable a user to filter the data being displayed to only show a subset of the available data (e.g., a subset of available products or the like). Similarly, the user interface can enable a user to sort and arrange the display metric data as desired.

As may be contemplated, the contents of the metrics reports displayed in FIGS. 4 and 5 relating to browser functionality, display modalities, the presence and type of text elements, the presence and type of icon elements and/or other such user interface elements described herein in connection with the network metric report are merely illustrative examples. As such, other types of browser functionality, display modalities, presence and type of text elements, presence and type of icon elements and/or other such user interface elements may be considered as within the scope of the present disclosure.

In order to generate metrics reports such as those illustrated in FIGS. 4 and 5, metrics service 209 may have access to log data dealing with a relatively large number of products published and/or distributed by a number of different product vendors and users. Accordingly, metrics service 209 may implement an authentication mechanism to provide access control to the various reports generated by metrics service 209. For example, a user that authenticates as being an administrator or operator of server computer system 200 may have sufficient access authority to retrieve the content of the metrics report depicted in FIG. 4 (which may be useful is diagnosing issues within server computer system 200 or optimizing resource utilization within server computer system 200). Such a report provides an overview of the various products installed within server computer system 200 and, as such, includes data describing the products of various different product vendors. Conversely, a product vendor-specific report, such as that depicted in FIG. 5 may only be accessible to the product vendor responsible for the products listed in the report. In that case, metrics service 209 first authenticates the product vendor and then generates a metrics report that includes only data for products associated with that vendor. In that manner, product vendors are prevented from viewing metrics reports for products distributed other entities (e.g., competitors and partners) that may themselves distribute products within server computer system 200.

As described above, the present system and method for monitoring and generating metric reports relating to the usage of products within a virtualized computing environment can be used in computer systems in which customers implemented virtual private networks or VNs.

Figure 6:
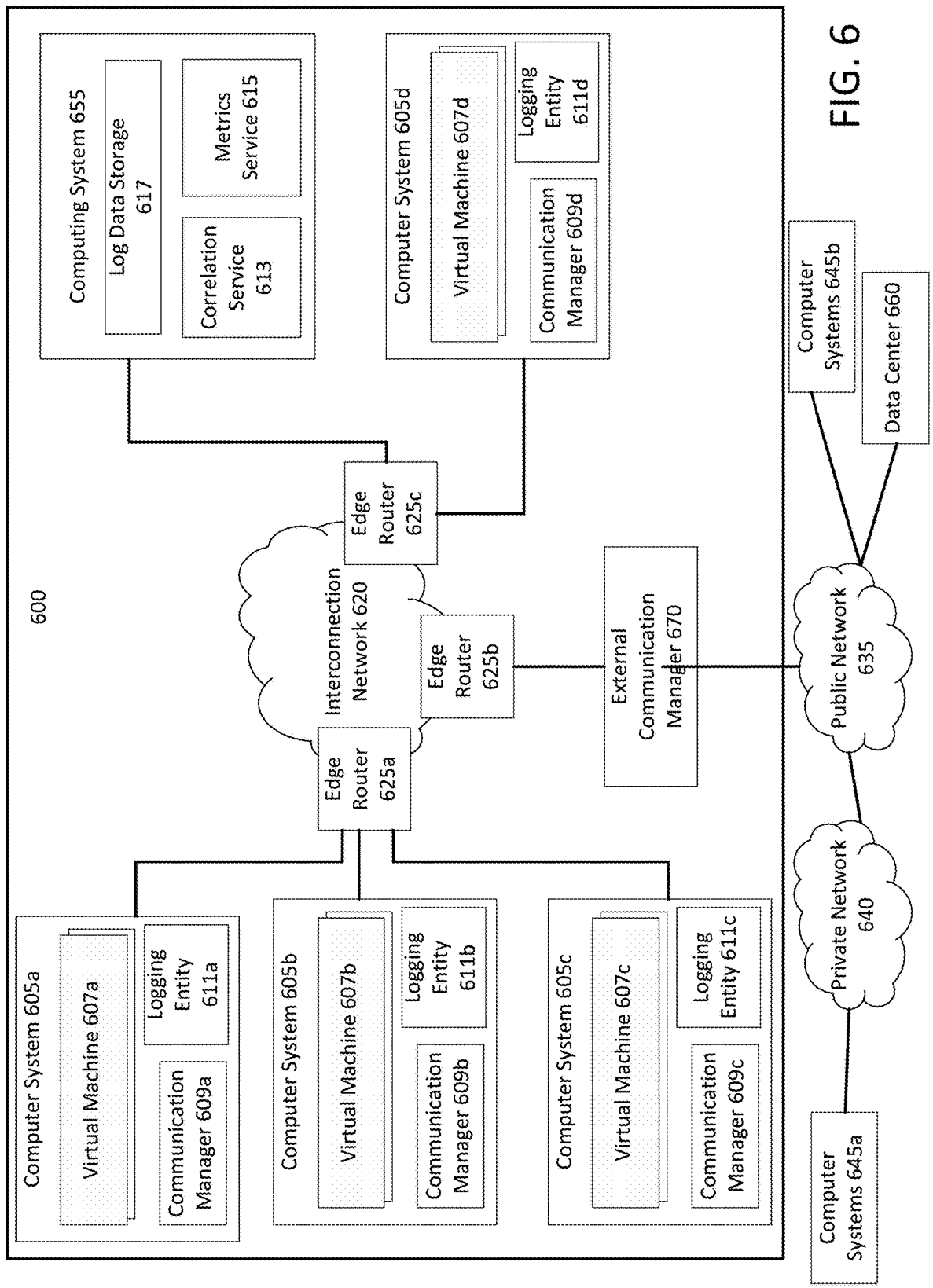
FIG. 6 is a block diagram depicting an example computing environment in which log information for virtual computer system instances within a private network can be captured.

FIG. 6 is a block diagram depicting an example computing environment 600 in which log information for virtual computer system instances within a VN can be captured and processed. Environment 600 includes a number of physical computing systems that may be co-located in one or more data centers and are interconnected via various networking devices and one or more physical networks. The physical computing systems and other devices are used in this example by a network service to enable customers to arrange their virtual computer system instances into multiple computer networks. The customers' networks can be implemented as VNs that use the physical network(s) as a substrate network upon which the VNs are overlaid.

Environment 600 can be connected to one or more public networks 635, which can provide access to remote computing system 645a via private network 640, to one or more other globally accessible data centers 660 that each have multiple computing systems at other geographical locations, and to one or more other remote computing systems 645b. Public network 635 may be, for example, a publicly accessible network of networks, possibly operated by various distinct parties, such as the Internet, and the private network 640 may be, for example, a corporate network that is wholly or partially inaccessible from computing systems external to the private network 640.

Environment 600 includes a number of physical computing systems 605a-605d and 655. Each physical computing system 605a-605d hosts multiple virtual computer system instances as well as a communication manager configured to route data communications to and from the virtual computer system instances. For example, computer system 605a includes multiple virtual computer system instances 607a and communication manager 609a to manage communications with virtual computer system instances 607a. Each virtual computer system instance 707a-607d is assigned a virtual network interface enabling each virtual computer system instance 707a-607d to communicate with components internal or external to environment 600.

Each physical computer system 605a-605d further includes a logging entity 611a-611d configured to monitor network traffic passing through the physical computer system 605a-605d and generate log data based thereon.

In an embodiment, each of the virtual computer system instances 607a-607d may operate as a distinct computing node of a computer network provided for a customer. Virtual computer system instances 607a-607d may resemble conventional virtual computing resources that have been instantiated by the customers of environment 600. In some cases, however, virtual computer system instances 607a-607d are created as instances of products provided by third parties, such as software vendors. Those product instances, once created, are accessible to the customer and may be allocated a private IP address, thereby placing the product instances into a VN maintained by the customer.

The product instances are generally virtual servers or virtual computing resources that are created according to a template associated with the product being instantiated. The template specifies how the product is to be configured when setup for the customer within the virtual computer system instance. That may involve specifying a particular configuration for the root volume of the instance when the product is setup. For example, an image of an operating system including the product and set of application servers and applications to be setup on the virtual computer system instances 607a-607d can be specified by the product's template. Additionally, the template may specify launch permissions to be associated with the product instances. Each product is associated with a particular identification code. When instantiating a product, the hypervisor managing the computer system 605a-605d running the virtual computer system instance 607a-607d may store the identifier of the machine image used to launch the virtual computer system instance and instantiate the product in, for example, memory. Additionally, the hypervisor can be programmed to make the image identifier available to the relevant logging entity 611a-611d as well as information that identifies which communications are associated with the virtual machine (e.g., an identifier of a virtual network interface, a virtual IP address used by the virtual machine). As such, when the logging entity 611a-611d processes data packets the logging entity 611a-611d can match information in the packets to the information that identifies which communications are associated with the virtual machine and add the machine image identifier to the record.

Physical computing system 655 may not execute any virtual machines in this example, and thus may each act as a distinct computing node that is part of a computer network provided for a client by the configurable network service. In other embodiments, all or none of the physical computing systems at the data center may host virtual machines. As depicted, computing system 655, in this example, includes log data storage 617 configured to store the log data generated by the various logging entities 611a-611d in environment 600. Physical computing system 655 also include correlation service 613 that, as described below, is configured to associate the log entries stored in log data storage 617 with particular products that either generated or received the network traffic that generated the log entries. Metrics service 615 is configured to process the log data stored in log data storage 617 to generate metrics reports enabling users to understanding how various products are being utilized within environment 600. Examples of such reports are depicted in FIGS. 4 and 5.

Environment 600 includes an interconnection network 620 with edge routers 625a-625c to route communications within environment 600, such as by forwarding packets or other data transmissions as appropriate based on characteristics of such data transmissions (e.g., header information including source and/or destination substrate network addresses, protocol identifiers, etc.) and/or the characteristics of the interconnection network 620 itself (e.g., routes based on physical network topology, etc.).

The illustrated communication managers 609a-609d manage communications sent to and from associated computing nodes within environment 600. For example, communication manager 609a manages communications associated virtual computer system instance 607a, communication manager 609d manages communications associated with virtual computer system instance 607d, and each of the other communication managers may similarly manage communications for a group of one or more other associated computing resources. External communication manager 670 manages external communications that enter and leave environment 600.

The illustrated communication managers may manage communications between computing resources of environment 600 so as to overlay virtual networks over the physical substrate network interconnecting the components of environment 600. Similarly, external communication manager 670 implements the virtual networks for external communications that enter and leave environment 600.

Thus, as one illustrative example, one of the virtual computer system instances 607a on computing system 605a may be part of a VN for a particular customer, along with one of the virtual computer system instances 607d on computing system 605d and optionally other computing nodes in environment 600. In that case, other virtual computer system instances 607a and virtual computer system instances 607d may be dedicated to other VNs for other customers.

In such a VN setup, a program executing for the customer on the virtual computer system instance 607a that is part of the customer's VN may then direct an outgoing communication (not shown) to the virtual computer system instance 607d that is part of the same VN, such as by specifying a virtual network address for that provided virtual computer network that is assigned to that destination virtual computer system instance 607d.

When sending such a communication, communication manager 609a receives the outgoing communication from the virtual computer system instance 607a, and in at least some embodiments determines whether to authorize the sending of the outgoing communication.

If communication manager 609a determines that the outgoing communication is authorized (or does not perform such an authorization determination), communication manager 609a determines the actual physical substrate network location corresponding to the destination virtual network address for the communication. Communication manager 609a then encapsulates the communication in a data packet that is addressed to communication manager 609d using a physical network address for physical computer system 605d.

When communication manager 609d receives the communication via interconnection network 620, communication manager 608d extracts the virtual destination network address and determines to which of the virtual computer system instances 607d the communication is directed. This may involve communication manager 609d determining whether the communication is authorized for the destination virtual computer system instance 607d. If the communication is determined to be authorized (or communication manager 609d does not perform such an authorization determination), communication manager 609d removes the encapsulating data packet of the communication, effectively re-headering the incoming communication so that it is directed to the virtual network address of the destination virtual computer system instances 607d. After re-headering the incoming communication, communication manager 609d then forwards the modified communication to the destination virtual computer system instances 607d for processing.

If the sending virtual computer system instance 607a instead (or in addition) directs an outgoing communication (not shown) to one or more intended destination computing systems external to environment 600, communication manager 609a receives and handles the outgoing communication in a similar manner. For example, a remote resource service may provide data storage services, and the outgoing communication may be a request to access a particular storage-related resource (e.g., to retrieve a stored object or other group of stored data).

Accordingly, environment 600 can provide virtual computer networks to customers by implementing the virtual networks as overlay networks using an underlying physical substrate network, such as using various communication managers and one or more external communication manager. In at least some embodiments, one or more system manager modules (not shown) may further facilitate configuring communications between virtual computer system instances, such as by tracking and/or managing which virtual computer system instances belong to which provided virtual networks, and by providing information about actual physical substrate network addresses that correspond to virtual network addresses used for a particular virtual network (e.g., by a particular customer or other entity). In addition, such a system manager module may receive an indication of a virtual computer system instance on a target physical computing system and of a provided virtual network to which the virtual computer system instance is to be associated, and then initiate configuration of a virtual machine communication manager for the target physical computing system so as to associate the virtual computer system instance with the virtual network, or the node communication manager module may instead initiate that configuration (e.g., when the virtual computer system instance first initiates or receives a communication).

During operation, communication managers 609a-609d may process data packets that are incoming and outgoing from their respective computer systems 605a-605d. This may involve the communication managers 609a-609d publishing processed (or partly-processed) data packets or communication flows into a queue, ready for transmission via the physical network infrastructure of environment 600. While the data packets or communication flows (or summaries of the same) reside within such a queue, the information describing the network communications being processed by the communication managers 609a-609d can be accessed by logging entities 611a for processing, as described below, to generate network log information.

While the various communication managers of environment 600 operate to route data packets between the various virtual computer system instances 607a, the logging entities 611a-611d on the physical computer systems 605a-605d are configured to identify attributes of those data packets and record those attributes into a log file. The log file may be local to the computer system 605a-605d or remote (e.g., stored within computing system 655) or another data storage system.

In various embodiments, the log information captured by logging entities 611a-611d can include customer identification information, virtual network driver identification information, packet count, byte count, timestamp corresponding to the start of the corresponding communication flow, timestamp corresponding to the end of the corresponding communication flow, and any security actions taken by the corresponding communication manager 609a-609d. In some embodiments, logging entities 611a-611d are also configured to identify a VN associated with the network traffic being logged (e.g., by accessing a look-up table of VNs made available through one or more of communication managers 609a-d) and incorporate the identification of the VN generating the network traffic into the log data.

Generally, logging entities 611a-611d will monitor traffic flowing through their respective communication manager 609a-609d. Upon identifying a data packet (or communication flow) passing through the respective communication manager 609a-609d, the logging entity 611a-611d will generate a log entry containing basic information about that data packet or communication flow. To illustrate, Table 4, depicts a raw log entry that may be generated by one or more of logging entities 611a-611d.

TABLE 4

2 123456789010 eni-abc123de 172.31.16.139 172.31.16.21 20641 22 6 20 4249 1418530010 1418530070 ACCEPT OK In the raw log entry of Table 4, the log entry includes a user identification or VN identification for the logging data ("123456789010"), an identification of the virtual interface processing the data packet that generated the log entry ("eni-abc123de"), source port ("22"), destination port ("6"), protocol identification ("6"), a size of the data packet or communication flow (4249), start and end times for the flow ("1418530010" and "1418530070", respectively), and an indication of whether the traffic was accepted ("ACCEPT") and whether the logging activity successfully completed ("OK"). In some embodiments, the logging entities 611a-611d may add an identifier used to identify the product VM to the log entry. For example, in the sample raw log entry of Table 4, above, the virtual network interface identification value is "eni-abc123de". Within environment 600, the virtual network interface identifications are unique to a particular virtual computer system instance 607a-607d. And, as such, using the virtual network interface identification, a particular logging entity can identify a particular virtual computer system instance 607a-607d that processed the data packet or communication flow associated with the log entity. The logging entity may access a look-up table that correlates virtual network interface identifications to machine image or instance identifications.

Once captured, the raw log data is transmitted by logging entity 611a-611d for storage and later processing. The raw log data may be stored in any suitable location that allows the log data to be later retrieved and processed. That storage location may reside within environment 600 or be external to environment 600 (e.g., transmitted to storage via public network 635). In the example depicted in FIG. 6, however, the raw log data generated by logging entities 611-a611d is stored in log data storage 617 within computing system 655.

At this point, in some embodiments, the raw log data does not identify a product associated with the data packet or communication flow. In this embodiment, to generate that information, correlation service 613 processes the raw log data stored in log data storage 617 in order to incorporate product-identifying information into the log data.

Figure 7:
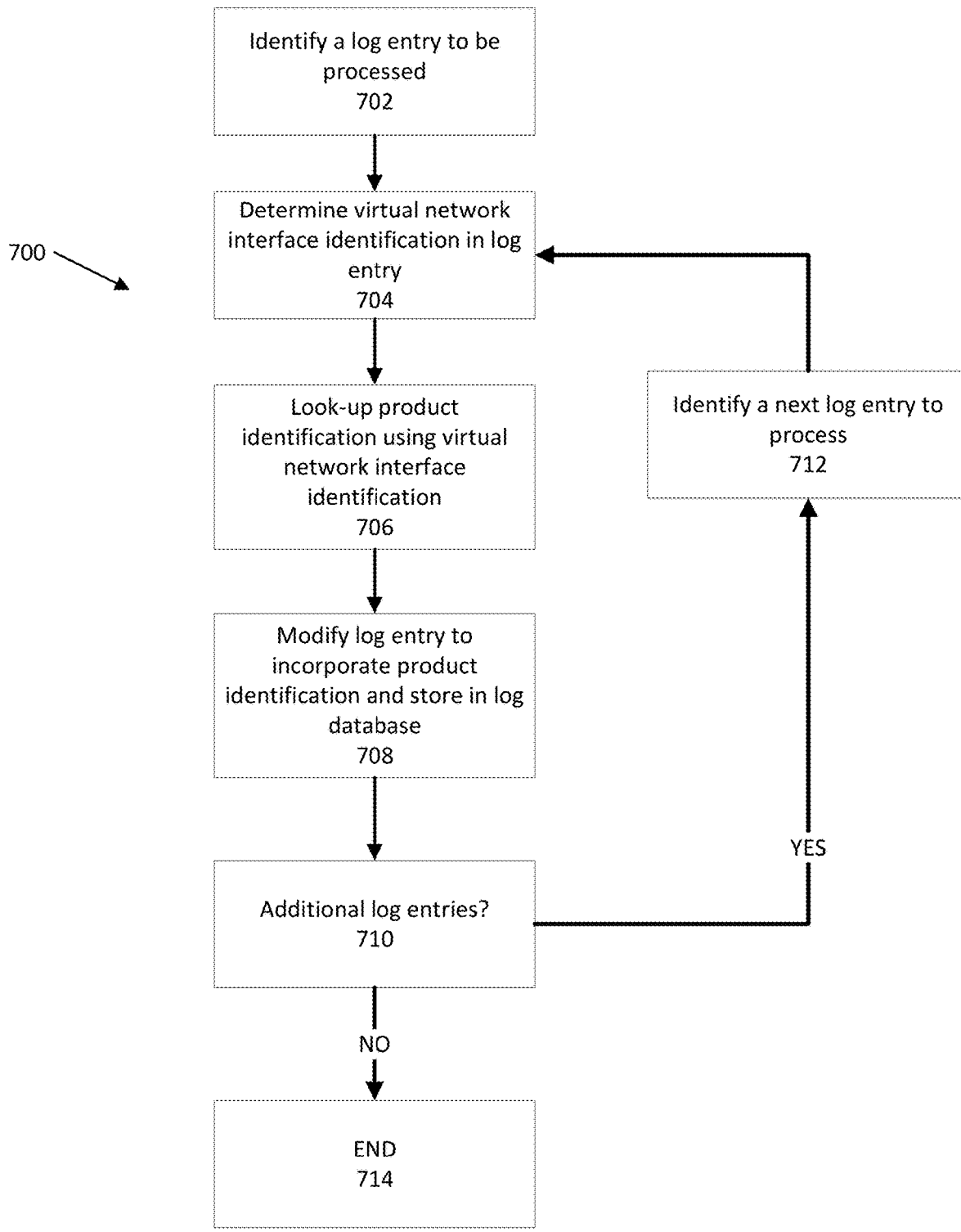
FIG. 7 is a flowchart depicting a method for a correlation service to generate log information that identifies a product associated with a virtual network interface.

FIG. 7 depicts method 700 that may be implemented by correlation service 613 to insert product identification information into the log data stored in log data storage 617. Generally, correlation service 613 may execute method 700 in order to process a set of log data that may include records for a relatively large number of data packets or communication flows. In some embodiments, this process can be executed by the logging entities 611a-611d.

In step 702, correlation service 613 identifies a first log entry to process. For example, correlation service 613 may only process log entries originating from particular sources (e.g., a range of IP addresses) or directed to particular destinations (e.g., a range of IP address). In other cases, correlation service 613 may only process log entries associated with particular types of network communications or involving particular ranges or source or destination ports.

Having identified a first raw log entry to process in step 702, in step 704 correlation service 613 determines a virtual network interface identification associated with the entry being processed. For example, in the sample raw log entry of Table 4, above, the virtual network interface identification value is "eni-abc123de". Within environment 600, the virtual network interface identifications are unique to a particular virtual computer system instance 607a-607d. And, as such, using the virtual network interface identification, correlation service 613 can identify a particular virtual computer system instance 607a-607d that processed the data packet or communication flow associated with the log entry.

With the virtual network interface identification determined (thereby identifying the virtual computer system instance 607a-607d that processed the data packet or communication flow associated with the log entry), in step 706 correlation service 613 determines the product identification of the virtual computer system instance associated with the virtual network interface identification using any suitable approach. In one embodiment, correlation service 613 may access the virtual computer system instance directly and execute an instruction via a CLI or API on the virtual computer system instance to determine the product identification or access a file stored in the destination virtual computer system instance that identifies the product identification. Alternatively, correlation service 613 may access a look-up table (e.g., stored within a memory of computing system 655) that correlates virtual network interface identifications to machine image identifications. For example, Table 5, below depicts such a look-up table that may be stored by computing system 655.

TABLE 5

| Virtual Network Interface Identification | Product Identification |
|---|---|
| eni-abc123de | MI-123456789 |
| eni-bcd234ef | MI-987654321 |
| eni-cde345fg | MI-123789456 |
| eni-def456gh | MI-789456123 |

With the product identification determined in 706, in step 708 correlation service 613 can modify the original raw log entry to insert the product identification information. In other embodiments, of course, the product identification information could instead be stored in a separate data structure that includes a reference back to the original log entry. For example, Table 6, below depicts the original raw log entry modified by correlation service 613 to include the product identification ("MI-123456789") associated with the virtual network interface identification ("eni-abc123de"). The modified log entry can then be stored back into log data storage 617 by correlation service 613.

TABLE 6

2 123456789010 eni-abc123de MI-123456789 172.31.16.139
172.31.16.21 20641 22 6 20 4249 1418530010 1418530070
ACCEPT OK In step 710, correlation service 613 determines where there are additional log entries in log data storage 617 to be processed. If not, the method ends at step 714. If, however, there are additional log entries to be processed, correlation service 613 identifies the next log entry to be processed in step 712 and then execute steps 704, 706, and 708 on the next log entry to determine a product identification with that log entry. The method depicted in FIG. 7 may be repeated by correlation service 613 in order to iterate through all log entries stored in log data storage 617 that require processing.

With the modified log entries (now including product identification) stored in log data storage 617, those entries can then be retrieved by a customer or other user of environment 600 and analyzed to monitor operations of environment 600. In some embodiments, metrics service 615 is configured to process the log entries stored in log data storage 617 to generate output reports. The output reports can, as depicted in FIGS. 4 and 5, display volumes of data transmitted and/or received by the various instances of different products operating within environment 600. The reports generated by the metric service can be used to ensure that the various virtual computer system instances 607a-607d in environment have sufficient resources and that compensation and cost structures in place with various product vendors are appropriate given those data traffic volumes.

When generating the metrics reports, metrics service 615 may consult a look-up table that correlates the product identifications stored in the log entries of log data storage 617 with more "human-readable" names for the respective product. An example of such a table is depicted below, and enables metrics service 615 to use identifiers for the products that are more familiar to a user than the product identifications, themselves.

TABLE 7

| Product Identification | Product Name |
|---|---|
| MI-123456789 | Enterprise Firewall Product v. 1.0 |
| MI-987654321 | Enterprise Firewall Product v. 1.1 |
| MI-123789456 | Router Product v. 1.0 |
| MI-789456123 | Packet Inspector v. 5.6 |

As depicted in Table 6, the log entries stored in log data storage 617 also encodes IP addresses for the sources and destinations of the data packets or communication flows. In some embodiments, correlation service 613 may be further configured to determine source and/or destination IP addresses in the log entries and then, if the source and/or destination associated with a particular data packet is associated with a product, incorporate the identification of that product into log entries.

Figures 8A, 8B:
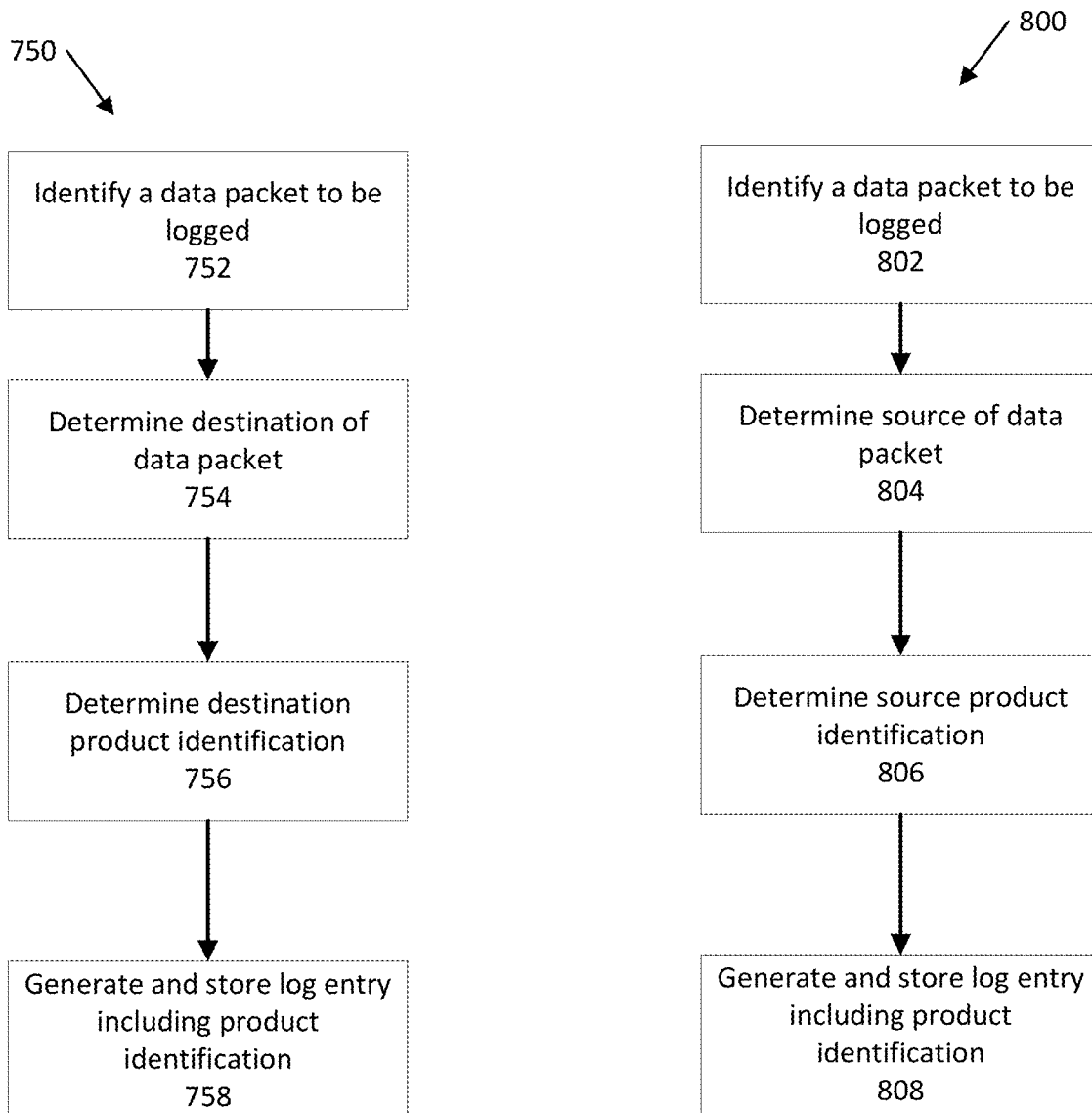
FIG. 8A is a flowchart depicting a method for a correlation service to generate log information that identifies a product associated with the destination of a data packet.
FIG. 8B is a flowchart depicting a method for a correlation service to generate log information that identifies a product associated with the source of a data packet.

FIG. 8A, for example, is a flowchart depicting method 750 for correlation service 613 (or another component of environment 600) to updated log data stored in log data storage 617 to identify products associated with the destination address of a data packet or communication flow.

In step 752, correlation service 613 identifies a log entry in log data storage 617 to process. At this point log entry includes a destination address (e.g., see destination address "172.31.16.21" in the example log entry of Table 6). Having identified a log entry to be processed, in step 754 correlation service 613 determines a destination address associated with the log entry. Then, in step 756 correlation service 613 determines a product identification associated with the destination address. Correlation service 613 can determine the product identification using any suitable approach. In one embodiment, correlation service 613 may access the virtual computer system instance associated with the destination address and execute an instruction via a CLI or API to determine the product identification, for example, or access a file stored in the destination virtual computer system instance that identifies the product identification. In that case, correlation service 613 may identify the virtual computer system instance associated with the destination by first determining a customer account associated with the log entry. Using a combination of the customer account information as well as the destination address in the log entry, correlation service 613 can identify the specific virtual computer system instance to which the data packet was directed. Alternatively, correlation service 613 may access a look-up table that correlates the destination address (optionally in combination with the customer's account information) with a particular product identification.

In step 758, with the product identification identified, correlation service 613 entity adds the product identification to the log entry being processed and stores the modified log entry back into log data storage 617. An example of such a log entry is shown below. In the example entry, the IP address of the data packet destination is 172.31.16.21 and the product identification MI-963852741 for that destination has been added to the log entry.

TABLE 8

2 123456789010 eni-abc123de 172.31.16.139 172.31.16.21 MI-963852741 20641 22 6 20 4249 1418530010 1418530070 ACCEPT OK Once stored in log data storage, the modified log entry can be accessed by metrics service 615 to generate reports detailing the usage of particular products within environment 600.

In other embodiments, correlation service 613 may also be configured to determine a particular product identification for the source destination of the log entries stored in log data storage 617. FIG. 8B, for example, is a flowchart depicting a method 800 for correlation service 613 (or another component of environment 600) to update log data stored in log data storage 617 to identify products associated with the source address of a data packet or communication flow.

In step 802, correlation service 613 identifies a log entry in log data storage 617 to process. Having identified a log entry to be processed, in step 804 correlation service 613 determines a source address associated with the log entry. Then, in step 806 correlation service 613 determines a product identification associated with the source address. Correlation service 613 can determine the product identification using any suitable approach. In one embodiment, correlation service 613 may access the virtual computer system instance associated with the source address and execute an instruction via a CLI or API to determine the product identification, for example, or access a file stored in the source virtual computer system instance that identifies the product identification. In that case, correlation service 613 may identify the virtual computer system instance associated with the source by first determining a customer account associated with the log entry. Using a combination of the customer account information as well as the source address in the log entry, correlation service 613 can identify the specific virtual computer system instance from which the data packet originated. Alternatively, correlation service 613 may access a look-up table that correlates the source address (optionally in combination with the customer's account information) with a particular product identification.

In step 808, with the product identification identified, correlation service 613 entity adds the product identification to the log entry being processed and stores the modified log entry back into log data storage 617. An example of such a log entry is shown below. In the example entry, the IP address of the source packet is 172.31.16.139 and the product identification associated with that source address MI-197346825 has been added to the log entry.

TABLE 9

2 123456789010 eni-abc123de 172.31.16.139 MI-197346825 172.31.16.21 20641 22 6 204249 1418530010 1418530070 ACCEPT OK Once stored in log data storage, the modified log entry can be accessed by metrics service 615 to generate reports detailing the usage of particular products within environment 600. The reports generated by metrics service 615 can, as depicted in FIGS. 4 and 5, display volumes of data transmitted and/or received by the various instances of different products operating within environment 600. The reports generated by the metric service can be used to ensure that the various virtual computer system instances 607a-607d in environment have sufficient resources and that compensation and cost structures in place with various product vendors are appropriate given those data traffic volumes.

Figure 9:
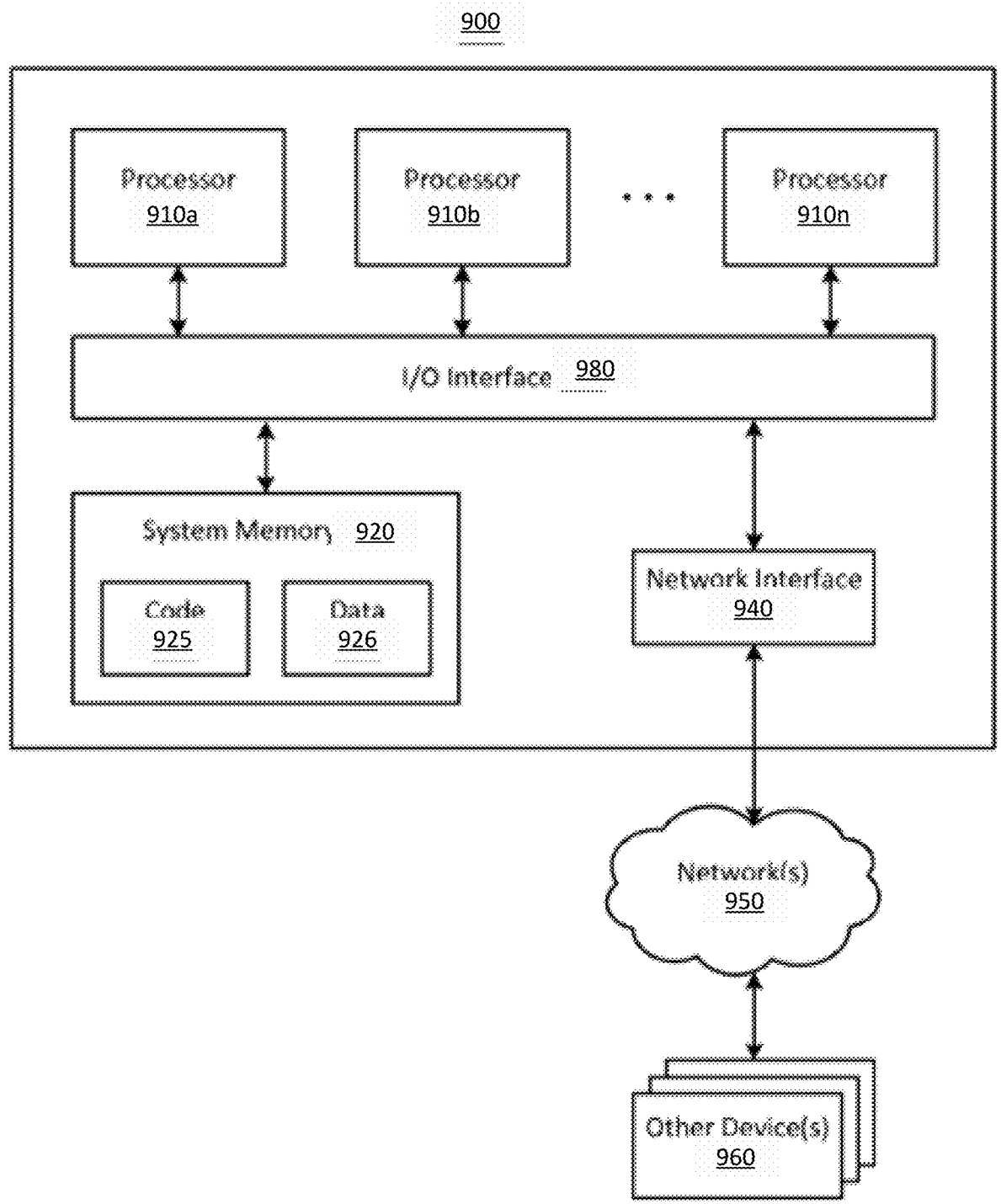
FIG. 9 is a block diagram depicting functional components of a general-purpose computing device.

In at least some embodiments, a computing device that implements a portion or all of one or more of the technologies described herein, including the techniques to implement the functionality of a system for logging network traffic within a multi-tenant environment can include a general purpose computer system that includes or is configured to access one or more computer-accessible media. FIG. 9 illustrates such a general-purpose computing device 900. In the illustrated embodiment, computing device 900 includes one or more processors 910a, 910b, and/or 910n (which may be referred herein singularly as "a processor 910" or in the plural as "the processors 910") coupled to a system memory 920 via an input/output (I/O) interface 980. Computing device 900 further includes a network interface 940 coupled to I/O interface 980.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, Power PC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods techniques, and data described above, are shown stored within system memory 920 as code 925 and data 926.

In one embodiment, I/O interface 980 may be configured to coordinate I/O traffic between processor 910, system memory 920, and any peripheral devices in the device, including network interface 940 or other peripheral interfaces. In some embodiments, I/O interface 980 may perform any necessary protocol, timing, or other data transformations to convert data signals from one component (e.g., system memory 920) into a format suitable for use by another component (e.g., processor 910). In some embodiments, I/O interface 980 may include support for devices attached through various types of peripheral buses, such as a variant of the Peripheral Component Interconnect (PCI) bus standard or the Universal Serial Bus (USB) standard, for example. In some embodiments, the function of I/O interface 980 may be split into two or more separate components, such as a north bridge and a south bridge, for example. Also, in some embodiments some or all of the functionality of I/O interface 980, such as an interface to system memory 920, may be incorporated directly into processor 910.

Network interface 940 may be configured to allow data to be exchanged between computing device 900 and other device or devices 960 attached to a network or network(s) 950, such as other computer systems or devices as illustrated in FIGS. 1, 2, and 6, for example. In various embodiments, network interface 940 may support communication via any suitable wired or wireless general data networks, such as types of Ethernet networks, for example. Additionally, network interface 940 may support communication via telecommunications/telephony networks, such as analog voice networks or digital fiber communications networks, via storage area networks, such as Fiber Channel SANs or via any other suitable type of network and/or protocol.

In some embodiments, system memory 920 may be one embodiment of a computer-accessible medium configured to store program instructions and data for implementing embodiments of the present methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 900 via I/O interface 980. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 900 as system memory 920 or another type of memory. Further, a computer-accessible medium may include transmission media or signals such as electrical, electromagnetic or digital signals, conveyed via a communication medium such as a network and/or a wireless link, such as may be implemented via network interface 940. Portions or all of multiple computing devices, may be used to implement the described functionality in various embodiments; for example, software components running on a variety of different devices and servers may collaborate to provide the functionality. In some embodiments, portions of the described functionality may be implemented using storage devices, network devices, or special purpose computer systems, in addition to or instead of being implemented using general purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like, or high performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements change over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, up-front cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager. Such an interface may include capabilities to allow browsing of a resource catalog and details and specifications of the different types or sizes of resources supported and the different reservation types or modes supported, pricing models, and so on.

Figure 10:
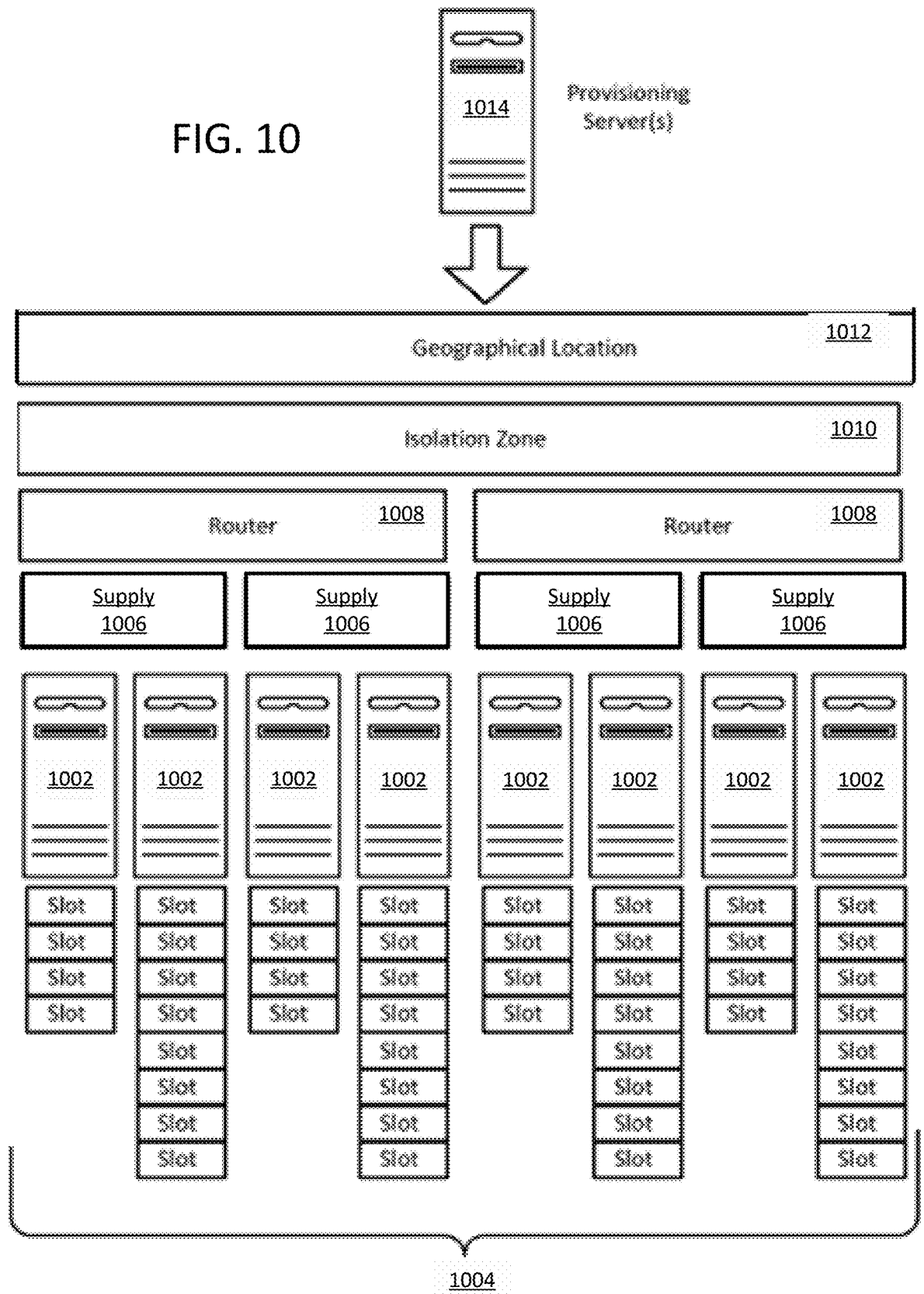
FIG. 10 is a block diagram depicting functional components of a data center.

In some embodiments, such as in FIG. 10, a data center 1000 may be viewed as a collection of shared computing resources and/or shared infrastructure. For example, as shown in FIG. 10, a data center 1000 may include virtual machine slots 1004, physical hosts 1002, power supplies 1006, routers 1008, isolation zone 1010, and geographical location 1012. A virtual machine slot 1004 may be referred to as a slot or as a resource slot. A physical host 1002 may be shared by multiple virtual machine slots 1004, each slot 1004 being capable of hosting a virtual machine, such as a guest domain. Multiple physical hosts 1002 may share a power supply 1006, such as a power supply 1006 provided on a server rack. A router 1008 may service multiple physical hosts 1002 across several power supplies 1006 to route network traffic. An isolation zone 1010 may service many routers 1008, the isolation zone 1010 being a group of computing resources that may be serviced by redundant resources, such as a backup generator. Isolation zone 1010 may reside at a geographical location 1012, such as a data center 1000. A provisioning server 1014 may include a memory and processor configured with instructions to analyze user data and rank available implementation resources using determined roles and shared resources/infrastructure in the calculation. The provisioning server 1014 may also manage workflows for provisioning and deprovisioning computing resources as well as detecting health and/or failure of computing resources.

A provisioning server 1014 may determine a placement of the resource within the data center. In some embodiments, this placement may be based at least in part on available computing resources and/or relationships between computing resources. In one embodiment, the distance between resources may be measured by the degree of shared resources. This distance may be used in the ranking of resources according to role. For example, a first system on a host 1002 that shares a router 1008 with a second system may be more proximate to the second system than to a third system only sharing an isolation zone 1010. Depending on an application, it may be desirable to keep the distance low to increase throughput or high to increase durability. In another embodiment, the distance may be defined in terms of unshared resources. For example, two slots 1004 sharing a router 1008 may have a distance of a physical host 1002 and a power supply 1006. Each difference in resources may be weighted differently in a distance calculation.

A placement calculation may also be used when selecting a prepared resource to transfer to a client account. In one embodiment, a client requests a virtual machine having an operating system. The provisioning server 1014 may determine that the request may be satisfied with a staged volume in a slot 1004. A placement decision may be made that determines which infrastructure may be desirable to share and which infrastructure is undesirable to share. Using the placement decision, a staged volume that satisfies at least some of the placement decision characteristics may be selected from a pool of available resources. For example, a pool of staged volumes may be used in a cluster computing setup. When a new volume is requested, a provisioning server 1014 may determine that a placement near other existing volumes is desirable for latency concerns. Therefore, the decision may find that sharing a router 1008 is desirable but sharing a supply 1006 and physical host 1002 is undesirable. A volume in the pool may then be selected that matches these attributes and placed preferably on a same router 1008 as the other volumes but not the same physical host 1002 or power supply 1006. In other examples of placement decisions, such as those relating to a database shard, sharing of infrastructure may be less desirable and a volume may be selected that has less infrastructure in common with other related volumes.

Embodiments of the invention include a system including a first computer system including a first memory coupled to a first processor. The first memory includes instructions that upon execution cause the first computer system to process a data packet associated with a first virtual computer system instance, and generate a log entry including a virtual network interface identification. The virtual network interface identification identifies the first virtual computer system instance. The instructions cause the first computer system to send the log entry to a second computer system. The second computer system includes a second memory coupled to a second processor. The second memory includes instructions that upon execution cause the second computer system to receive the log entry from the first computer system. The log entry includes the virtual network interface identification. The instructions cause the second computer system to determine a machine image used to instantiate the first virtual computer system instance by using the virtual network interface identification in a database lookup operation, determine that the machine image is provided by a first vendor, update a record indicating usage of virtual computer system instances created using the machine image, and make the record available to the first vendor.

In another embodiment, a system includes a first computer system including a first memory coupled to a first processor. The first memory includes instructions that upon execution cause the first computer system to receive a log entry from a second computer system. The log entry includes a virtual network interface identification associated with a first virtual computer system instance. The instructions cause the first computer system to determine a machine image using the virtual network interface identification, and update a record indicating usage of virtual computer system instances created using the machine image.

In another embodiment, a method includes receiving a log entry from a computer system. The log entry includes a virtual network interface identification associated with a first virtual computer system instance. The method includes determining a machine image using the virtual network interface identification, and updating a record indicating usage of virtual computer system instances created using the machine image.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The invention claimed is:

1. A system, comprising:
a first computer system and a second computer system, the first computer system including a first memory coupled to a first processor, the first memory including instructions that upon execution cause the first computer system to:
process a network data packet including a virtual network interface identification associated with a virtual network interface of a first virtual computer system instance wherein the virtual network interface identification identifies one or both of a source of the network data packet and a destination of the network data packet,
generate a log entry including the virtual network interface identification,
send the log entry to the second computer system,
the second computer system including a second memory coupled to a second processor, the second memory including instructions that upon execution cause the second computer system to:
receive the log entry from the first computer system, the log entry including the virtual network interface identification,
determine a machine image used to instantiate the first virtual computer system instance by using the virtual network interface identification in a database lookup operation,
determine that the machine image is provided by a first vendor,
update a record indicating usage of virtual computer system instances created using the machine image based on amounts of network traffic processed by each of those virtual computer system instances, and
make the record available to the first vendor.

2. The system of claim 1, wherein the log entry includes a source address of the network data packet and the second computer system is configured to:
determine a second machine image used to instantiate a second virtual computer system instance associated with the source address; and
update a second record indicating usage of virtual computer system instances created using the second machine image.

3. The system of claim 1, wherein the second computer system is configured to:
determine, using the record indicating usage of virtual computer system instances created using the machine image, an amount of network traffic associated with the virtual computer system instances created using the machine image;
generate a metric report, wherein the metric report includes the amount of network traffic; and
make the metric report available to the first vendor.

4. A system, comprising:
a first computer system including a first memory coupled to a first processor, the first memory including instructions that upon execution cause the first computer system to:
receive a log entry from a second computer system, the log entry including a virtual network interface identification, the virtual network interface identification identifying a source of a network data packet or a destination of the network data packet, the virtual network identification being associated with a virtual network interface of a first virtual computer system instance,
determine, using the virtual network interface identification, a machine image used to instantiate the first virtual computer system instance; and
update a record indicating usage of virtual computer system instances instantiated using the machine image based on amounts of network traffic processed by each of those virtual computer system instances.

5. The system of claim 4, wherein the log entry includes a source address associated with a second virtual computer system instance and wherein the first computer system is configured to:
determine a second machine image used to instantiate the second virtual computer system instance; and
update a second record indicating usage of virtual computer system instances created using the second machine image.

6. The system of claim 4, wherein the first virtual computer system instance executes at least one of a firewall, a deep packet inspector, a data loss prevention service, and a network appliance.

7. The system of claim 4, wherein the first virtual computer system instance includes an instantiation of the machine image.

8. The system of claim 4, wherein the first computer system is configured to:
determine, using the record indicating usage of virtual computer system instances created using the machine image, an amount of network traffic associated with virtual computer system instances created using the machine image; and
generate a metric report, wherein the metric report includes the amount of network traffic.

9. The system of claim 4, wherein the first computer system is configured to access an application program interface provided by the second computer system executing the first virtual computer system instance to determine the machine image.

10. The system of claim 4, wherein the first computer system is configured to update the record indicating usage of virtual computer system instances created using the machine image by transmitting a hypertext transfer protocol request to a remote computer system, the hypertext transfer protocol request encoding the machine image.

11. The system of claim 4, wherein the first computer system is configured to:
   determine the machine image is provided by a first vendor using the machine image in a first database lookup; and
   make the record available to the first vendor.

12. The system of claim 4, wherein the second computer system executes the first virtual computer system instance.

13. The system of claim 4, wherein the first computer system is configured to:
   determine a product name using the machine image in a second database lookup; and
   encode the product name into the record indicating usage of virtual computer system instances created using the machine image.

14. A method, comprising:
   receiving a log entry from a computer system, the log entry including a virtual network interface identification;
   determining that the virtual network interface identification is associated with a first virtual computer system instance;
   determining, using the virtual network interface identification, a machine image used to instantiate the first virtual computer system instance; and
   updating a record indicating usage of virtual computer system instances instantiated using the machine image based on amounts of network traffic processed by each of those virtual computer system instances.

15. The method of claim 14, wherein the log entry includes a source address associated with a second virtual computer system instance and further comprising:
   determining a second machine image used to instantiate the second virtual computer system instance; and
   updating a second record indicating usage of virtual computer system instances created using the second machine image.

16. The method of claim 14, further comprising:
   determining, using the record indicating usage of virtual computer system instances created using the machine image, an amount of network traffic associated with virtual computer system instances created using the machine image; and
   generating a metric report, wherein the metric report includes the amount of network traffic.

17. The method of claim 14, further comprising accessing an application program interface provided by the computer system to determine the machine image.

18. The method of claim 14, wherein updating the record indicating usage of virtual computer system instances created using the machine image includes transmitting a hypertext transfer protocol request to a remote computer system, the hypertext transfer protocol request encoding the machine image.

19. The method of claim 14, further comprising:
   determining the machine image is provided by a first vendor using the machine image in a first database lookup; and
   making the record available to the first vendor.

20. The method of claim 14, further comprising:
   determining a product name using the machine image in a second database lookup; and
   encoding the product name into the record indicating usage of virtual computer system instances created using the machine image.

\* \* \* \* \*